Patented Aug. 24, 1926.

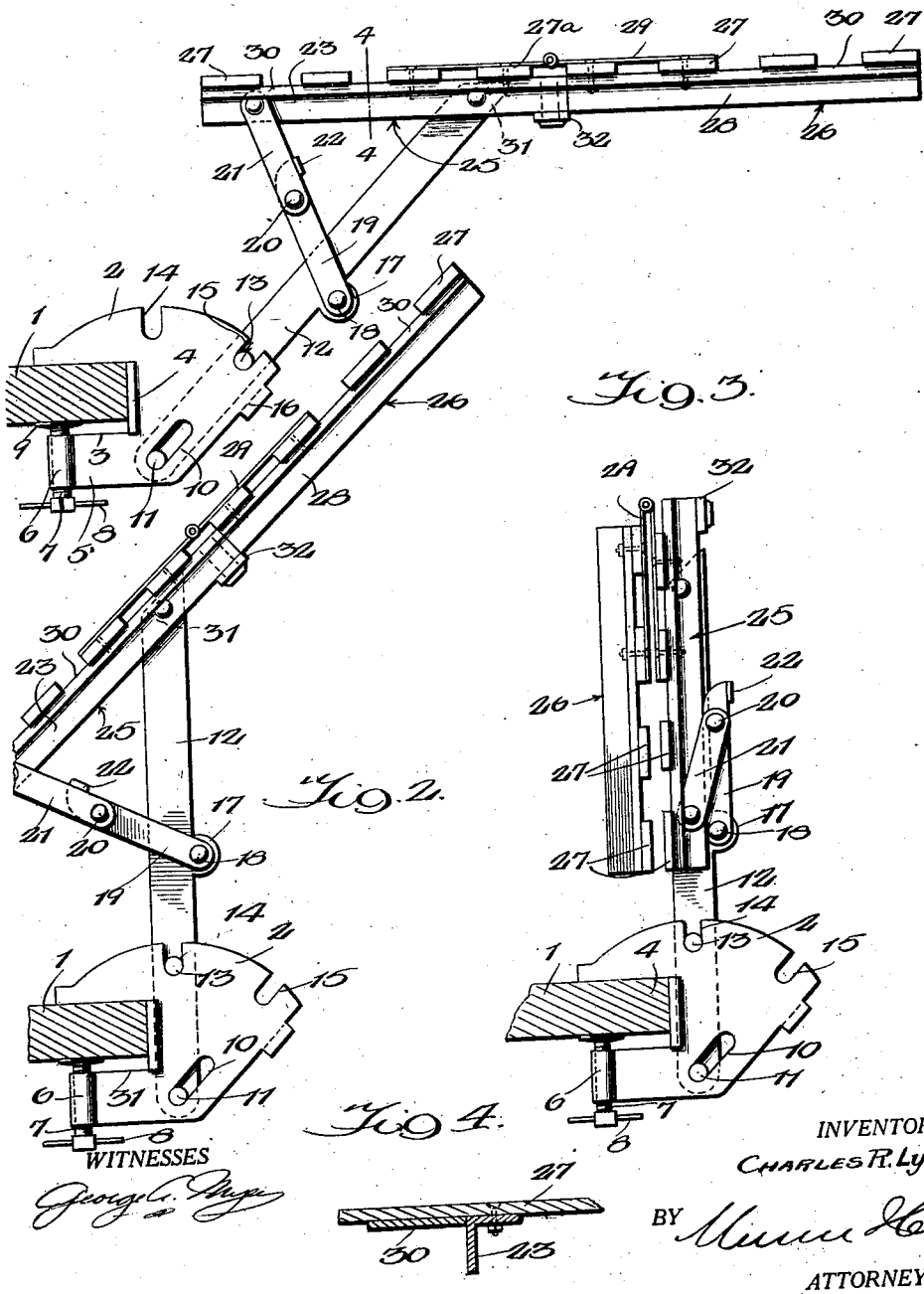

1,597,081

UNITED STATES PATENT OFFICE.

CHARLES ROBERT LYON, OF BUTTE, MONTANA.

LUGGAGE CARRIER AND TOURIST TABLE.

Application filed March 10, 1924, Serial No. 698,166. Renewed March 12, 1926.

This invention relates to luggage carriers adapted to be connected to the running board of automobiles and has for its object the provision of a device for supporting a restricted quantity of luggage at the side of an automobile, the device being extensible for increasing its luggage carrying capacity.

A further object of the invention is the provision of an extensible luggage carrier adapted to be applied to the running board of an automobile and which may be extended in a horizontal position and employed as a table during the day or as a bed at night.

A still further object of the invention is the provision of a combined luggage carrier and table adapted to be connected to the running board of an automobile and which may be folded into a compact, unitary structure when not in use.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:—

Figure 1 is an end view of the luggage carrier connected to the running board of an automobile and shown extended for use as a table.

Figure 2 is an end view of the luggage carrier extended beyond its normal position for increasing the carrying capacity of the luggage carrier.

Figure 3 is an end view of the luggage carrier located in normal position and substantially parallel to the side of the body of the automobile.

Figure 4 is a vertical section taken along the line 4—4 of Figure 1.

Referring more particularly to the drawings, 1 designates a running board of an automobile to which is adapted to be clamped a pair of brackets 2 in spaced relation. Each bracket comprises a plate having a slot 3 adapted to receive the outer edge of running board 1 with the edge in engagement with a lip 4 formed from the metal of the plate by the cutting of the slot 3. This lip is bent at right angles to the plate and is adapted to embrace the longitudinal edge of the running board 1 and aid in maintaining the bracket in rigid position on the running board. An arm 5, which is formed by the cutting of a slot 3 is provided with an internally threaded sleeve 6. This sleeve is adapted to receive a screw 7 having an operating handle 8 at its outer end and a swivelled cap 9 engageable with the under face of the running board 1.

The lower end of the plate is provided with a slot 10 adapted to receive a pin 11 projecting laterally from the lower end of an arm 12. A second pin 13, spaced from the pin 11, projects laterally from the same face of the arm 12 and is adapted to engage either one of a pair of notches 14 and 15. The intermediate portion of the arm 12 is provided with a perforated ear 17 to which is pivoted at 18 one end of a link 19. The upper end of the link is pivoted at 20 to a link 21. The laterally projecting lug 22 on the upper end of the link 19 is adapted to engage the longitudinal edge of the link 21 and lock the links 19 and 21 in alinement.

The link 21 has its upper end pivoted to an end bar 23 of a frame which forms a part of the side wall of the luggage carrier or a part of the table when the frames 25 and 26 are located in a horizontal position. The upper end of the arm 12 is likewise pivoted to the end bar 23 at the opposite end of said bar. It must be remembered that at least two brackets 2 together with two pairs of links 19 and 21 and two arms 12 are employed for supporting the frames 25 and 26. The respective brackets, links and arms being located in spaced relation at opposite ends of the running board 1.

Cross bars 27 are secured to the end bars 23 and form the tops of the table or the side supports for the luggage. The frame 26 comprises a pair of spaced end bars 28 and transverse bars 27. A pair of hinges 29 bolted to the members 27 of the frame permit the frame 26 to be folded upon the frame 25 as shown in Figure 3 and when the luggage carrier is located in a vertical position for carrying a limited amount of luggage.

The frame 26 may be alined with the frame 25 as shown in Figure 2 and with both frames extended at an angle to the horizontal whereby a greater quantity of luggage may be carried when desired on the running board.

When the tourists employ the carrier as a table the arm 12 may be raised while in the position shown in Figure 2 so that the pin 11 will ride upwardly in the slot 10 and pin 13 will ride upwardly in the notch 14 until said pin is withdrawn from the notch. When the arm 12 may be oscillated until the pin 13 reaches notch 15 whence the arm may be depressed until the pin 13 is seated at the lower end of the notch 15. The frames 25 and 26 will then be located in a horizontal position and the same may be employed as a table.

It must be borne in mind that while I have stated the device is adapted to be employed as a luggage carrier or as a table the same may be used when desired as a frame for supporting a mattress at the side of the automobile and employed as a bed at night.

While I have shown the bracket and frames adapted to be clamped in position on the running board of an automobile the frames, through the clamping plate 2, may be used in connection with any fixed support and for a variety of purposes for supporting articles in a plurality of different positions.

When the pin 13 is located in slot 14 in either the position shown in Figures 2 or 3, the frame 26 may be extended, as shown in Figure 2, to increase the carrying capacity of the luggage carrier, or the frame 26 may be folded upon frame 25 with both frames maintained in a vertical position in order to support luggage between the side of the car and the frame 26 of the carrier.

Abutting the angle iron 23 and secured to the under portion of the transverse bars 27 is a bar 30 for reinforcing the frames 25 and 26.

The upper end of arm 12 is sheared off at an acute angle to the edge of the arm as shown at 31 and engages the transverse bar 27ª for aiding in supporting the frame 25 in a horizontal position. A transverse bar 32 is bolted to the under face of angle irons 23 at the outer ends for bracing the frame 25 where said frame is hingedly connected to frame 26.

What I claim is:—

1. A combined luggage carrier and table comprising a bracket adapted to be clamped to the running board of an automobile said bracket including a plate having notches at its upper end and a slot at its lower end, an arm provided with laterally projecting pins with one of the pins adapted to be engaged by one of said notches, the other pin being received within the slot, the interchange of the pin with the notches varying the positions of the arm, a frame pivotally connected with the outer free end of the arm, links hingedly connected together and pivotally connecting an end of the frame with an intermediate portion of the arm for supporting the frame at an acute angle to the arm.

2. A combined luggage carrier and table comprising a bracket adapted to be clamped to the running board of an automobile, said bracket including a plate having notches at its upper end and a slot at its lower end, an arm provided with laterally projecting pins with one of the pins adapted to be engaged by one of said notches, the other pin being received within the slot, the interchange of the pin with the notches varying the positions of the arm, a frame pivotally connected with the outer free end of the arm, links hingedly connected together and pivotally connecting an end of the frame with an intermediate portion of the arm for supporting the frame at an acute angle to the arm, a frame hingedly connected with the first mentioned frame and adapted to aline with the first mentioned frame or be folded upon the same.

CHARLES ROBERT LYON.